United States Patent [19]

Huff

[11] Patent Number: 4,947,966
[45] Date of Patent: Aug. 14, 1990

[54] VEHICLE GEARBOX WITH INCORPORATED BRAKE

[75] Inventor: Martin Huff, Tettnang, Fed. Rep. of Germany

[73] Assignee: Zahnradfabrik Friedrichshafen AG, Fed. Rep. of Germany

[21] Appl. No.: 335,968

[22] PCT Filed: Sep. 29, 1987

[86] PCT No.: PCT/EP87/00556

§ 371 Date: Mar. 16, 1989

§ 102(e) Date: Mar. 16, 1989

[87] PCT Pub. No.: WO88/02324

PCT Pub. Date: Apr. 7, 1988

[51] Int. Cl.$^5$ ............................................. F16D 65/24
[52] U.S. Cl. ................................... 188/170; 188/72.3; 192/13 A
[58] Field of Search ............... 74/785; 188/72.3, 170, 188/171; 192/13 R

[56] References Cited

U.S. PATENT DOCUMENTS

| | | | |
|---|---|---|---|
| 2,953,040 | 9/1960 | Christenson et al. | 74/781 |
| 3,301,359 | 1/1967 | Cole et al. | 192/4 A |
| 3,439,766 | 4/1969 | Dence et al. | 192/4 A |
| 3,547,233 | 12/1970 | Girvan | 188/170 |
| 3,680,666 | 8/1972 | Sommer | 188/170 |
| 3,754,625 | 8/1973 | Voth et al. | 192/4 A |
| 3,770,085 | 11/1973 | Cottingham | 188/170 X |
| 4,037,694 | 7/1977 | Keese | 192/4 A |
| 4,173,269 | 11/1979 | Craig | 188/71.5 |
| 4,317,498 | 3/1982 | Jirousek et al. | |
| 4,407,382 | 10/1983 | Dziuba et al. | |
| 4,461,373 | 7/1984 | Pratt et al. | 192/4 A |
| 4,491,202 | 1/1985 | Schmitt | 188/71.5 |
| 4,540,073 | 9/1985 | Rogier | 192/4 A |
| 4,566,563 | 1/1986 | Chauveau et al. | 188/18 A |
| 4,610,331 | 9/1986 | Rogier et al. | 188/18 A |
| 4,616,520 | 10/1986 | Ehrlinger et al. | 74/325 |
| 4,624,353 | 11/1986 | Sailer et al. | 192/70.12 |
| 4,649,772 | 3/1987 | Daniel et al. | 74/785 |
| 4,655,326 | 4/1987 | Osenbaugh | 188/18 A |

FOREIGN PATENT DOCUMENTS

| | | |
|---|---|---|
| 0058107 | 8/1982 | European Pat. Off. . |
| 0143898 | 8/1984 | European Pat. Off. . |
| 3013431A1 | 11/1981 | Fed. Rep. of Germany . |
| 3248250 | 3/1984 | Fed. Rep. of Germany . |
| 3013431C2 | 2/1985 | Fed. Rep. of Germany . |
| 3545369 | 12/1985 | Fed. Rep. of Germany . |
| 2650490 | 5/1986 | Fed. Rep. of Germany . |
| 2514091 | 4/1983 | France . |
| 2535255 | 4/1984 | France . |
| WO80/02821 | 12/1980 | PCT Int'l Appl. . |
| 2109880 | 6/1983 | United Kingdom . |

*Primary Examiner*—Duane A. Reger
*Attorney, Agent, or Firm*—Davis, Bujold & Streck

[57] ABSTRACT

This gear-box with incorporated brake (8, 9, 10, 11, 12) comprises an annular braking piston (9) which is guided axially in the outer collar of a ring gear support (2). Between the piston (9) and the ring gear support (2) is carried, in the direction of the brake discs (11, 12), a compression spring (23) arranged radially under the latter, the preloading and travel of which are sufficient to compress, with the piston (9), the brake discs (11, 12) against a braking pressure plate (17) which is not movable axially, and against the resistance of return springs (29) acting on said piston. The annular braking piston (9), over a part of the support surface of the spring (23), is offset axially by a radial gap in which engages a radial collar (24) fitted on an annular piston which raises the brake (25) linked thereto and is axially offset in the direction of the ring gear support (2). In the event of radial overlapping, said piston (25) is guided in a pressure-tight and axially movable manner, on a shoulder of the hub (3) of the support (2), located on the gear-box side. The piston surface (25), on the brake side, forms, jointly with the hub shoulder (3) and an intermediate ring (26) previously mounted axially on the latter by means of a flange, a brake-lifting annular cylinder (27). During operation of said cylinder by means of brake-lifting pressure lines (28) incorporated in the hub support (1), the piston (25) compresses the spring (23), thereby enabling the return of the annular braking piston (9) also as a result of the return springs (29) of the latter. The brake discs (11, 12), which in any case are present, may thus be used both for operational braking and for parking braking, without a major modification or need for further space, using the same gear casings (21) as are necessary also for operational brakes alone.

10 Claims, 1 Drawing Sheet

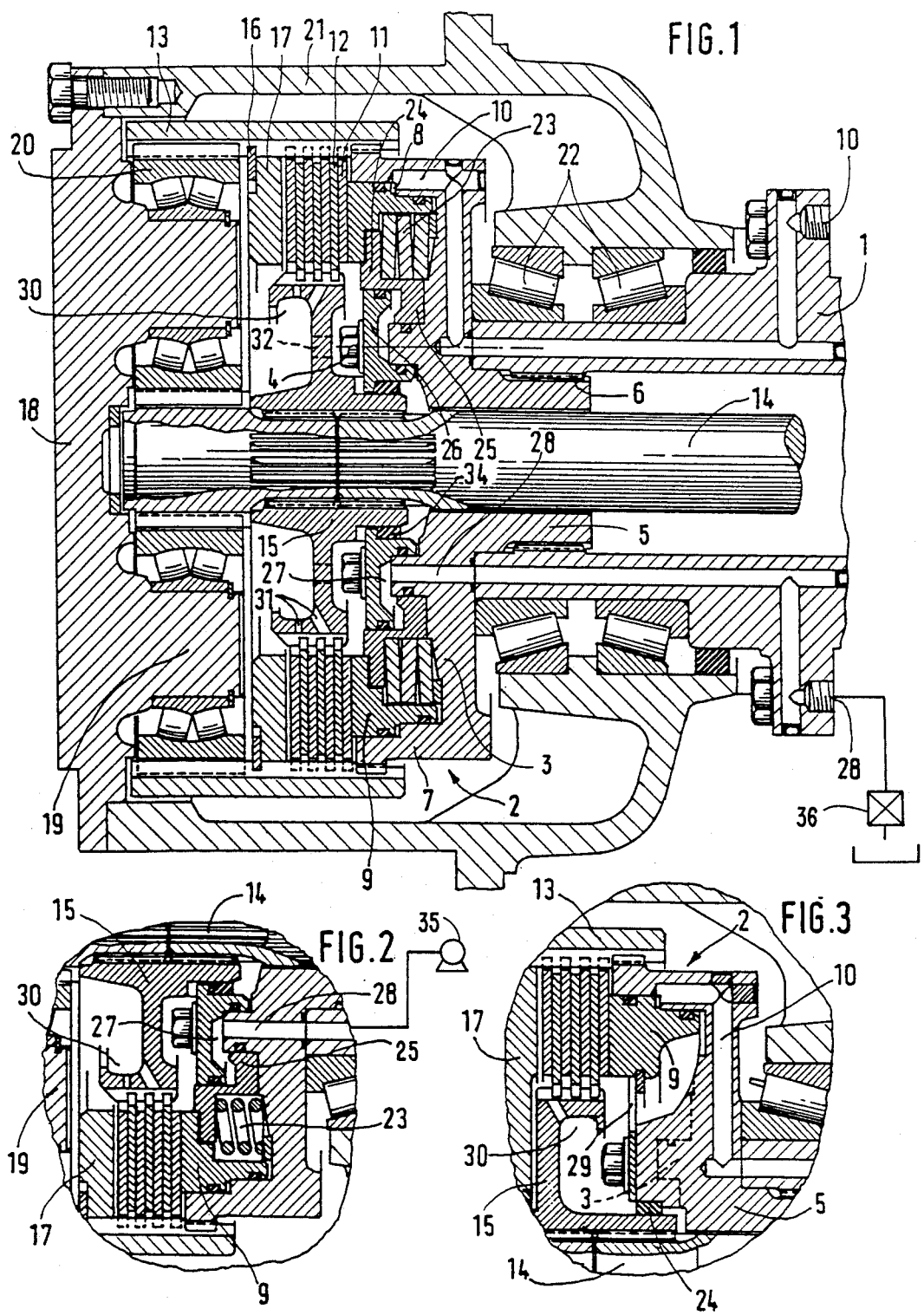

VEHICLE GEARBOX WITH INCORPORATED BRAKE

The invention concerns a vehicle gearbox incorporating a brake. Such vehicle gearboxes have been disclosed, for instance, in DE-C-30 13 431. Therefrom a brake incorporated in the gearbox housing of a wheel head, having oil-wetted braking discs, has become known and in which a braking piston guided inside a ring gear support for the planetary gear enclosed by the housing allows a fluid-actuatable activation of a service brake by compressing the braking discs thereof For housing reasons, it did not seem possible to use said braking device as a parking brake on account of the predetermined dimensions of the housing. Thus, in order not to lengthen the housing, in those vehicles, it was necessary to provide separately arranged parking brakes outside the housing, such as on added axles, in addition to the service brake inside the housing. This resulted not only in additional construction costs and use of space but also in dangers of contamination and damage due to accumulation of slime, ground contacts, etc.

The problem now to be solved by the invention is to house, in the same gearbox housings where hitherto only one service brake was housed in the ring gear support of a planetary gear, an additional parking brake acting on the same braking discs without enlargement of the housing or complicated the manipulation, in a manner such that the installation of the parking brake can also be optionally offered without a fundamental change of construction.

The solution is obtained by the fact that a parking brake acting on the same braking discs also present is housed in an axial free space between a ring gear support and a brake, in addition to the service brake, within unchanged permanent dimensions of the housing and nearly radially covered by the service brake. In case of failure of the source of pressure fluid, a compression spring system pressing against the braking pressure plate and is capable of overcoming with certainty the force of the return springs that keep the brake disengaged during travel is, for this purpose, supported not only against the brake pressure plate but also, with a special saving of space, against a brake-lifting piston which upon activation of a brake-lifting cylinder provided on the hub of the ring gear support is capable, via its own fluid line, of again loosening and constantly keeping disengaged the parking brake until the brake-lifting line again relaxes. Here the arrangement of the brake-lifting cylinder and of the compression-spring system is such that both the braking piston and the ring gear support, in the design provided for the use of the parking brake, can optionally be used and limit the adaptation steps to a few bores and overwindings.

When a ring, externally enveloped by an annular brake-lifting piston and intermediate between the face end on the brake side of the hub collar of the ring gear support and a fastening bolt that simultaneously axially locks the ring gear support on the axle line, is suspended and non-rotatably retained on an inner surface of the hub collar designed as peripheral sealing surface, a configuration of the annular brake-lifting cylinder results that is especially favorable in manufacture and also space saving.

When as a result of the use of a wheel-shaped braking disc support, the inner braking discs receive a relatively larger inner diameter, another space-saving possibility for housing the compression spring set is offered radially beneath the annular braking piston, and the web of the braking disc support can be axially removed or offset according to the axial outlines of the annular brake-lifting cylinder.

By means of an outer rim of the braking disc support shaped to form a permanent oil ring beneath the braking discs upon rotation of the braking disc support and the radial oil-passage bores provided therein, which are uniformly distributed on the periphery, an intensive cooling of the braking discs is ensured despite reduced space conditions.

With an outer rim of the braking disc support projecting on the planetary side and axial bores in the web, a circulation of oil favorable for lubrication of the planetary support can be obtained.

When using the plate springs as compression springs and self-spreading braking discs instead of other return springs, a further economy of space and of construction parts and simplification in the assembly results.

By virtue of the offset arrangement and of the configuration of compression springs and return springs, according to the main direction of force, the total length is likewise reduced.

By means of return springs designed as flat springs with a radial main direction and one-sided fixing to the fastening bolt of the ring gear support, a braking piston system of especially brief construction and easy to assemble is obtained.

By using a pressure-resistance valve that vents upon actuation of the service brake and an added pressure reservoir, a possibility of brake actuation especially practical and space saving can be provided with the independently guided brake-lifting line.

When attaching a manually operable auxiliary pump to the central fluid-supply line, the parking brake can also be disengaged when, for instance, the central source of motor fluid is not available due to motor failure and yet the vehicle must be towed away.

The embodiment according to the invention is not limited to the combinations of features of the claims. For the expert other logical possible combinations result from the stated problem.

Other advantages of the invention can be seen from the drawings.

FIG. 1 shows an example of utilization combined with a planetary gearbox housed in a gear hub in which a braking disc support is provided beneath the rim of which there is an oil seal facing the planet bolts and wherein a compression spring system that loads the braking piston consists of plate springs while the brake-lifting cylinder is superimposed on the gear-side inner hub collar of the ring gear support.

FIG. 2 shows a modification of this embodiment, insofar as the oil seal is remote from the planetary bolts, and the compression spring system consists of coil springs.

FIG. 3 shows a sectional detail having identical conditions of assembly without a parking brake but with a hub collar of the ring gear support and a braking piston to which the guide or sealing surfaces of the brake-lifting cylinder and a parking braking piston can always be attached subsequently without additional space requirements (see the dashed outline). In this embodiment, return springs for the braking piston are shown at the same time as a fastening bolt of the ring gear support with fixed flat springs clapped in the plane of the figure, the free end of which is supported against the braking piston in a manner such that when the compression springs are compressed, the braking piston is kept spaced apart from the braking discs.

In FIG. 1, a ring gear support 2 is tightly pre-flanged to a hub support 1 by means of fastening bolts 4 that mesh with inner gear-side hub collar 3, an inner hub collar 5 remote from the gearbox being centrally introduced in an inner gear 6 of the hub support 1. Another gearbox-side external hub collar 7 surrounds a braking cylinder 8 from where a braking piston 9 axially guided therein can be brought into contact against braking discs 11, 12 by fluid supplied via braking pressure lines 10 introduced in the ring gear support 2 and the hub support 1. Both the external braking discs 11 in ring gear 13 supported by the ring gear support 2 and the internal braking discs 12 on a braking disc support 15, rotated along with a central shaft 14, are held non-rotating but axially movable. When the annular braking piston 9 is activated, the braking discs 11, 12 are pressed against a braking pressure plate 17 that is axially locked by a guard ring 16 on the ring gear 13 which prevents contact with the end faces of the planet shafts 19 retained in a housing cover 18 on the end-face side and the planetary gears 20 rotating thereon which are driven inside by the central shaft 14. The braking discs 11 and the braking pressure plate 17 are non-rotatably supported outside against the inner gear of the ring gear 13. The housing cover 18 closes housing 21 that encases both the ring gear support 2 and the ring gear 13, the brake 8, 9 and the gearbox 14, 19, 20.

In the embodiment shown, the housing can rotate on bearings 22 supported by the hub support 1 and carry a vehicle wheel which completely externally covers the gearbox housing 21. According to the invention, between the ring gear support 2 and the rear side of the annular braking piston 9 that faces it, a compression spring 23 is axially supported, shown here as plate-spring set. The annular braking piston 9 peripherally surrounds the spring 23 with play and forms, between its end face on the brake side and the rear side of the annular braking piston 9 remote from the brake, a radial gap into which projects, with slight axial play, an external radial collar 24 of an annular brake-lifting (releasing) piston 25 axially movably guided on an outer cylindrical sealing surface of the gearbox-side hub collar 3 of the ring gear support 2. In the embodiment, the annular brake lifting piston 25, situated within the radial cover of the piston 9, and the radial collar 24 carried by it, are axially offset by approximately the length of the spring, and the spring 23 is maintained centered on its inner side facing the shaft 14 by a cylindrical area. The inner side of said cylindrical area between the collar 24 and the piston 25 forms another concentric sealing surface of the piston 25 against which abuts an intermediate ring 26, similar to an annular flange, which is tightly screwed on via the fastening bolt 4 against the end face of the hub collar 3 of the ring gear support 2. An annular brake-lifting (releasing) cylinder 27 results here between the intermediate ring 26 and the piston 25 and discharge from an externally situated source of fluid advances coaxially within the shaft 14 in separate brake-lifting (releasing) pressure lines 28 through the hub support 1 and the hub collar 3 of the ring gear support 2. By activation of the annular brake-lifting cylinder 27, the annular brake-lifting piston 25 with the radial collar 24 attached thereto is pressed in the direction of the ring gear support 2 until stopped, the spring 23 being held at the maximum compression and allowing the annular brake piston 9 to be in a position away from the braking discs 11 or 12 when no braking is to take place. In case of braking, the annular braking piston 9 can be brought unhindered into contact against the braking discs 11, 12 by fluid supply via the line 10 or by the expansion of the spring 23 from the position near the annular parking brake piston 25. But if no fluid supply is ensured via the line 10, as happens in the case of a motor stoppage, the spring 23 has enough expansion force to bring the annular brake-lifting piston 25 together with its radial collar 24 into contact against the resistance of return springs 29 of the piston 9 (see FIG. 3) and thus also the annular braking piston 9 against the braking discs 11 or 12 with a force such that the driven system (vehicle or the like) cannot automatically be set in motion, for instance, in case of a pressure drop. By a change-over valve 36 in the pressure fluid system, known per se, or on the braking pedal plate, it is ensured that the brake-lifting pressure never stands opposed to the braking pressure of the service brake. For housing both brake-actuating pistons 9 and 25 and the accessory springs 29 and 23 in the minimal space sought, the intermediate ring 26 was designed on the brake side substantially radially snug with the radial collar 24, and the pressure springs 23 together with the braking piston 25 were housed, with a special saving of space and without any enlargement relative to a housing 21 for the parking brake 25, 26, in a free space remaining between the braking disc support 15 and the ring gear support 2, radially beneath the annular braking piston 9, with extensive alignment of the ring gear support 2 perpendicular to the shaft 14. The fastening bolts 4 mesh here in a bolt hole substantially equal to the coaxial lengths of the pressure lines 10, 28 in the brake-side collar of the hub support 1 and require no outer threading of the gearbox-side hub collar 3 or on the hub support 1.

While in FIG. 1 the braking disc support 15 has an oil seal 30, open in relation to the planets 20 and the supports thereof, from which radial ducts lead to the braking discs 11, 12 and the web of the braking disc support 15 needs axial bores to ensure a favorable circulation of oil in the brake area, in FIG. 2 the oil seal 30 is remote from the planets 20 and a relatively tight sealing braking pressure plate 17 can be provided between the ring gear 13 and the hub of the braking disc support 15 in order not to impair, during rough operation, due to eventually impure lubricant from the area of the braking discs 11, 12, the lubricant reservoir of the planets 20. Besides, the compression spring 23 is indicated in FIG. 2 as a plurality of peripherally uniformly distributed coil springs where, in the interspaces still remaining on the periphery, space can be left for likewise housing, without any need of extra space, return coil springs 29 (not shown here) that act upon the annular brake piston. Thus separate self-spreading designs of the braking discs 11 or 12 in substitution of return springs can be avoided.

In FIG. 3 for simplifying the comparison, a construction of the ring gear support 2 with its inner hub collar 3 penetrated by the fastening bolt 4 in a design without parking brake 23, 25, 26, 27 is shown. It is indicated, by means of a dashed outline, that it is easily possible according to the invention to re-process in a simple manner when necessary additional serial blanks of equal dimensions for the ring gear support 2 and the annular braking piston 9 in a manner such that the parts of the parking brake can also be always subsequently used, when desired, without a fundamental structural change of the braking system. Thus, further important advantages in economy and time of delivery result from the simplification of interdepartmental passage of material.

The so-called wheel head gears shown in the above embodiments are features of the solution and likewise can be advantageously used in the case of any other brakes incorporated in the gear box housing and operating in a similar manner.

Reference numerals:

1. hub support
2. ring gear support
3. gearbox-side hub collar inside
4. fastening bolt
5. hub collar remote from gearbox
6. inner gear of 1
7. gearbox-side hub collar outside
8. annular braking cylinder
9. annular braking piston
10. braking pressure line
11. outer braking disc
12. inner braking disc
13. ring gear
14. shaft
15. braking disc support
16. guard ring in 13
17. braking pressure plate
18. housing cover
19. planet shaft
20. planet gear
21. gearbox housing
22. bearing for 21
23. compression spring
24. radial collar
25. annular braking piston
26. intermediate ring
27. annular brake lifting cylinder
28. brake lifting pressure line
29. return springs
30. oil seal
31. radial bores in 15
32. horizontal bores in 15
33. intermediate seal 15/17
34. intermediate seal 15/26
35. manually operable auxiliary pump
36. pressure-retaining valve.

I claim:

1. A vehicle transmission, of a planetary design, having an integrated service and parking brake with inner brake discs (12) being supported by a central shaft (14) and outer brake discs (11) being non-rotationally supported by a ring gear (13) connected via a ring-gear support (2), having an annular collar (7) and an inner hub collar (3), with a hub support (1), a service-brake annular piston (9) being actuable toward said brake discs (11, 12) by pressure provided by a service-brake pressure line (10) against a force provided by recoil spring means (29) for engaging the brake, angularly disposed pressure spring means (23) forcing said service-brake annular piston (9) against said brake discs, and a brake releasing annular piston (25) being independently actuable away from said brake discs via a separate brake releasing pressure line (28), wherein said service-brake annular piston (9) is a stepped piston located in said outer annular collar (7) and forms therewith a service brake annular cylinder (8) which, when activated by said service brake pressure line, engages the brake, and said brake releasing annular piston (25) abuts against said service-brake annular piston (9) via a radial collar (24) and forms therewith a chamber facing said ring-gear support (2) which accommodates said pressure spring means (23), said pressure spring means abuts against said ring-gear support (2) and said brake releasing annular piston (25) and is preloaded so that it can overcome the force exerted by said recoil spring means (29) and bias said service-brake annular piston to engage the brake, and said braking release annular piston (25) is guided by said inner hub collar (3) of said ring-gear support (2) and forms with an intermediate ring (26) attached to said inner hub collar (3), said brake releasing annular cylinder (27) which communicates with said brake releasing pressure line (28) whereby activation of said brake releasing annular cylinder compresses said pressure spring means (23) and prevents said pressure spring means from engaging the brake.

2. A transmission according to claim 1, wherein said inner brake discs (12) are radially supported on a wheel-shaped brake-disc support (15), supported by said central shaft (14), having an external diameter which substantially coincides with a circular path defined by centers of planet shafts (19) of an axially arranged planetary transmission (14, 19, 20, 13).

3. A transmission according to claim 2, wherein said brake-disc support (15) has an outer rim with radial oil passage bores (31) therein.

4. A transmission according to claim 3, wherein said brake-disc support (15) has an outer rim projecting toward the planetary transmission and a horizontal bore (32) in a web of said support (15).

5. A transmission according to claim 1, wherein said pressure spring means (23) are plate springs and said recoil spring mans are self-spreading brake discs (11).

6. A transmission according to claim 1, wherein said pressure spring means (23) is a plurality of individual coil springs uniformly distributed about the periphery of said chamber and said recoil spring means is a plurality of spiral tension springs offset with respect thereto about the periphery.

7. A transmission according to claim 1, wherein said recoil spring means (29) is a plurality of circumferentially spaced leaf springs each attached at one end to said hub support (1) by fastening means (4) and extend radially outward and the opposite end thereof is axially supported against a projection of said service-brake annular piston (9) for returning said service-brake annular piston (9) to disengage the brake.

8. A transmission according to claim 1, wherein said brake releasing pressure line (28) has a pressure-retaining valve which opens upon actuation of said service-brake annular piston (9) and a pressure reservoir.

9. A transmission according to claim 1, wherein said brake releasing pressure line (28) is actuable by a manually operable auxiliary pump when a central source of fluid fails.

10. A transmission according to claim 1, wherein means are provided in the pressure lines which ensures simultaneous deactivation o said brake releasing pressure line (28) when said service-brake pressure line (10) is activated.

* * * * *